(12) United States Patent
Gier-Zucketto et al.

(10) Patent No.: US 8,991,620 B2
(45) Date of Patent: Mar. 31, 2015

(54) WOVEN FILTER FABRIC FOR A BAND FILTER

(75) Inventors: Joachim Gier-Zucketto, Wuerselen (DE); Matthias Bartel, Vienna (AT); Dieter Vogl, Wolfpassing (AT); Joachim Kuhlmann, Kreuztal (DE)

(73) Assignee: SMS Siemag AG, Duesseldorf (DE)

( * ) Notice: Subject to any disclaimer, the term of this patent is extended or adjusted under 35 U.S.C. 154(b) by 403 days.

(21) Appl. No.: 13/201,456

(22) PCT Filed: May 12, 2010

(86) PCT No.: PCT/EP2010/002891
§ 371 (c)(1),
(2), (4) Date: Jan. 10, 2012

(87) PCT Pub. No.: WO2010/130412
PCT Pub. Date: Nov. 18, 2010

(65) Prior Publication Data
US 2012/0118834 A1   May 17, 2012

(30) Foreign Application Priority Data

May 14, 2009  (DE) .......................... 10 2009 021 398
Dec. 23, 2009 (DE) .......................... 10 2009 060 252
Feb. 11, 2010 (DE) .......................... 10 2010 007 553

(51) Int. Cl.
*B01D 29/07* (2006.01)
*B01D 39/08* (2006.01)
*D03D 13/00* (2006.01)
*D03D 15/00* (2006.01)

(52) U.S. Cl.
CPC ...... *B01D 39/083* (2013.01); *B01D 2239/1233* (2013.01); *B01D 2239/1291* (2013.01); *D03D 13/008* (2013.01); *D03D 15/00* (2013.01); *D10B 2321/042* (2013.01); *D10B 2505/00* (2013.01); *D10B 2505/04* (2013.01)
USPC ............... 210/499; 442/76; 442/79; 442/189; 442/208

(58) Field of Classification Search
CPC ........ B01D 39/08; B01D 37/00; D03D 41/00; D03D 15/00
USPC .............. 210/224, 499, 767; 442/76, 78, 189, 442/208
See application file for complete search history.

(56) References Cited

U.S. PATENT DOCUMENTS

| | | | | |
|---|---|---|---|---|
| 6,479,143 | B1 * | 11/2002 | Tamaru et al. | 428/364 |
| 7,452,831 | B2 * | 11/2008 | Yamada et al. | 442/239 |
| 2005/0103970 | A1 | 5/2005 | Kuo | |
| 2005/0218068 | A1 | 10/2005 | Komatsu et al. | |
| 2009/0032475 | A1 * | 2/2009 | Ferrer et al. | 210/799 |

FOREIGN PATENT DOCUMENTS

| | | |
|---|---|---|
| DE | 102007038828 A1 | 2/2009 |
| EP | 1116510 A | 7/2001 |

(Continued)

*Primary Examiner* — Arti Singh-Pandey
(74) *Attorney, Agent, or Firm* — Andrew Wilford

(57) ABSTRACT

The present invention relates to a filter cloth for a belt filter, wherein the filter cloth has an air permeability of 100 l/(min*dm$^2$) to 350 l/(min*dm$^2$) and fibers of the filter cloth have a fiber thickness of 25 μm to 35 μm and contain from 50% by weight to 100% by weight of perfluoroalkoxyalkane (PFA). The filter cloth has 25 to 35 warp threads (3) and 15 to 25 weft threads (2) per 1 cm.

7 Claims, 2 Drawing Sheets

(56) References Cited

FOREIGN PATENT DOCUMENTS

| JP | 08325890 | A | 12/1996 |
| JP | 2002336609 | A | 11/2002 |
| JP | 2004137118 | a | 5/2004 |
| JP | 2005274543 | A | 10/2005 |

* cited by examiner

WOVEN FILTER FABRIC FOR A BAND FILTER

CROSS REFERENCE TO RELATED APPLICATIONS

This application is the US-national stage of PCT application PCT/EP2010/002891 filed 12 May 2010, published 18 Nov. 2010 as WO2010/130412, and claiming the priority of German patent application 102009021398.8 itself filed 14 May 2009, German patent application 102009060252.6 itself filed 23 Dec. 2009, and German patent application 102010007553.1 filed 11 Feb. 2010.

FIELD OF THE INVENTION

The present invention relates to a filter cloth for a belt filter, in particular for use in hydrothermal acid regeneration.

BACKGROUND OF THE INVENTION

In hydrothermal acid regeneration, ferric oxides, in particular $Fe_2O_3$, precipitate from a 75% aqueous $FeCl_3$ solution at a temperature of approximately 170° C. and are filtered out.

The hydrothermal acid regeneration in metal processing, in particular after pickling of metal strips, is concerned with the regeneration of hydrochloric acid contaminated with $FeCl_2$. To do this, the following method steps are carried out.

(1) The hydrochloric acid containing $FeCl_2$ is concentrated.
(2) $FeCl_2$ is oxidized with $O_2$ at 150° C. and 7 bar to form $FeCl_3$:

$$2FeCl2+2HCl+\tfrac{1}{2}O_2 \to 2FeCl_3+H_2O$$

(3) $Fe_2O_3$ precipitates during hydrolysis at 170° C. and atmospheric pressure. Reusable 18%-30% hydrochloric acid is obtained:

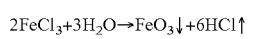

$$2FeCl_3+3H_2O \to FeO_3\downarrow+6HCl\uparrow$$

In industrial production, $Fe_2O_3$ is separated from the solution by a belt filter. A belt filter is very useful in industrial production for separating solid substances from liquids. The liquid to be filtered is conveyed onto the filter fleece web. The solid particles are retained on the filter fleece. The cleaned liquid flows into the storage tank and can be discharged from there for reuse or disposal. The residue remaining on the fleece forms a filter cake. If the density of the filter cake obstructs an optimal outflow of the liquid, the filter cake together with the fleece is transported automatically into a waste tank. The entire process is carried out continuously and fully automatically without interrupting the flow of liquid.

It has been found that the known filter cloths are not suitable to be used in a vacuum belt filter.

OBJECT OF THE INVENTION

It is the object of the present invention to provide a belt filter that meets the requirements in terms of durability and capability of a belt filter for separating ferric oxides from acidic hot solutions under vacuum.

SUMMARY OF THE INVENTION

The object of the present invention is attained by a filter cloth for a belt filter where the filter cloth has an air permeability of 100 l/(min*$dm^2$) to 350 l/(min*$dm^2$) and the fibers of the filter cloth have a fiber thickness of 25 µm to 35 µm and 50% by weight to 100% by weight of perfluoroalkoxylalkane (PFA).

Within the meaning of the invention, air permeability means air volume in liters per time in minutes and per area in $dm^2$, l/min/$dm^2$, expressed as l/(min*$dm^2$).

Due to the durability and capability, the filter cloth according to the invention is suitable for a belt filter for separating ferric oxides from acidic hot solutions under vacuum.

Perfluoroalkoxylalkane (PFA) is a completely fluorinated polymer, a copolymer of polytetrafluoroethylene (PTFE) and poly-(perfluorovinylmethylether). PFA can be processed thermoplastically, for example by injection molding or polymer welding. PFA has low strength and low hardness.

A preferred embodiment of the invention is a filter cloth for a belt filter where the fibers have a fiber thickness of 28 µm to 32 µm. In this range for the fiber thickness, very good results are achieved. Particularly good results for a vacuum belt filter are achieved with a monofilament from PFA with a thickness of approximately at least 30 µm.

A preferred embodiment of the invention is a filter cloth for a belt filter where the fibers of the filter cloth contain from 90% by weight to 100% by weight of PFA. The best results are achieved with fibers that contain PFA in the range of 90% by weight to 100% by weight.

A preferred embodiment of the invention is a filter cloth for a belt filter where the filter cloth has an air permeability of 100 l/(min*$dm^2$) to 200 l/(min*$dm^2$). In this range, very good filtration results are achieved.

A preferred embodiment of the invention is a filter cloth for a belt filter where the filter cloth has 25 to 35 warp threads and 15 to 25 weft threads per 1 cm. In these ranges for warp and weft threads, very good results are achieved for the filter cloth.

A preferred embodiment of the invention is a filter cloth for a belt filter where the filter cloth is longer than 7000 mm, preferably 7000 mm to 8000 mm long, and has a width from 700 mm to 800 mm. A belt filter with these dimensions is particularly well suited and usable.

A further aspect of the invention is a method of producing a filter cloth for a belt filter with an air permeability of 100 l/(min*$dm^2$) to 350 l/(min*$dm^2$) where fibers with a thickness of 25 µm to 35 µm and with 50% by weight to 100% by weight of PFA are woven to form a filter cloth with 25 to 35 warp threads and 15 to 25 weft threads per 1 cm.

A further aspect of the invention is the use of the filter cloth according to the invention for a belt filter for separating solid ferric oxides, in particular $Fe_2O_3$, from an acidic hot aqueous $FeCl_3$ solution, in particular during a hydrothermal acid regeneration.

BRIEF DESCRIPTION OF THE DRAWING

The invention is explained in more detail by means of a drawing and an example. Therein.

SPECIFIC DESCRIPTION OF THE INVENTION

Figure 1:
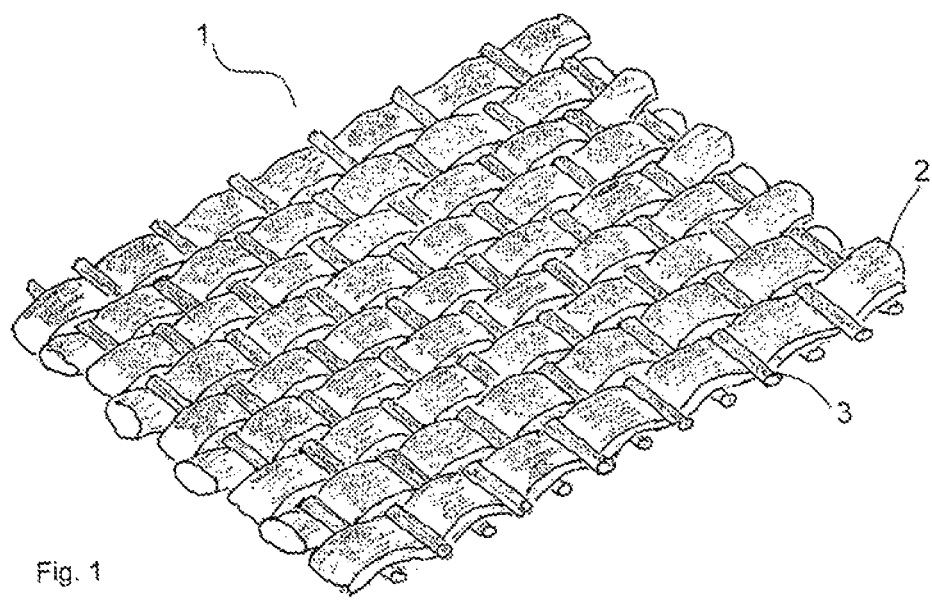
FIG. 1 is a perspective top view of a filter cloth according to the invention.

The filter cloth 1 shown in FIG. 1 is illustrated with a PFA monofilament standard thread with a thickness of approximately 27 µm, with an air permeability of 100 l/(min*$dm^2$), 200 l/(min*dm$^2$) and 350 l/(min*dm$^2$). Here, weft threads 2 and warp threads 3 are woven with 31 warp threads and 20 weft threads per 1 cm to form a filter cloth 1 with a length of 8000 mm and a width of 800 mm. After weaving, the filter cloth 1 is calendered three times for adjusting the air permeability. Heat and pressure are introduced into the fabric by heating and cooling rolls. This way, the fabric shrinks by approximately 10% to 31 threads per 0.7 cm and a length of 7000 mm and a width of 700 mm.

Figure 2:
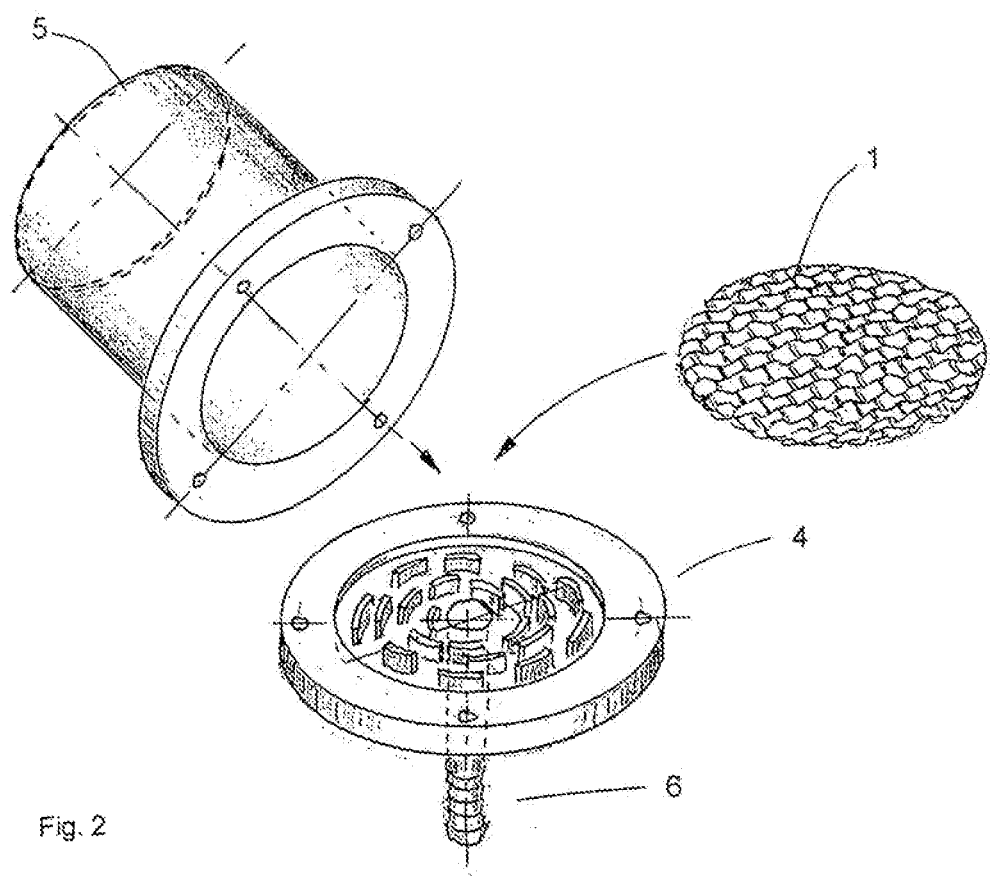
FIG. 2 is a perspective exploded view of a Nutsche filter with cover.

The Nutsche filter 4 and cover 5 shown in FIG. 2 represent the important parts of a laboratory apparatus for testing the filter cloth 1. The filter cloth 1 is placed onto the Nutsche filter 4, and the Nutsche filter is screwed together with the cover 5. In the lower region, the Nutsche filter 4 has a suction nozzle 6. A vacuum hose 9 is connected to the suction nozzle 6.

Figure 3:
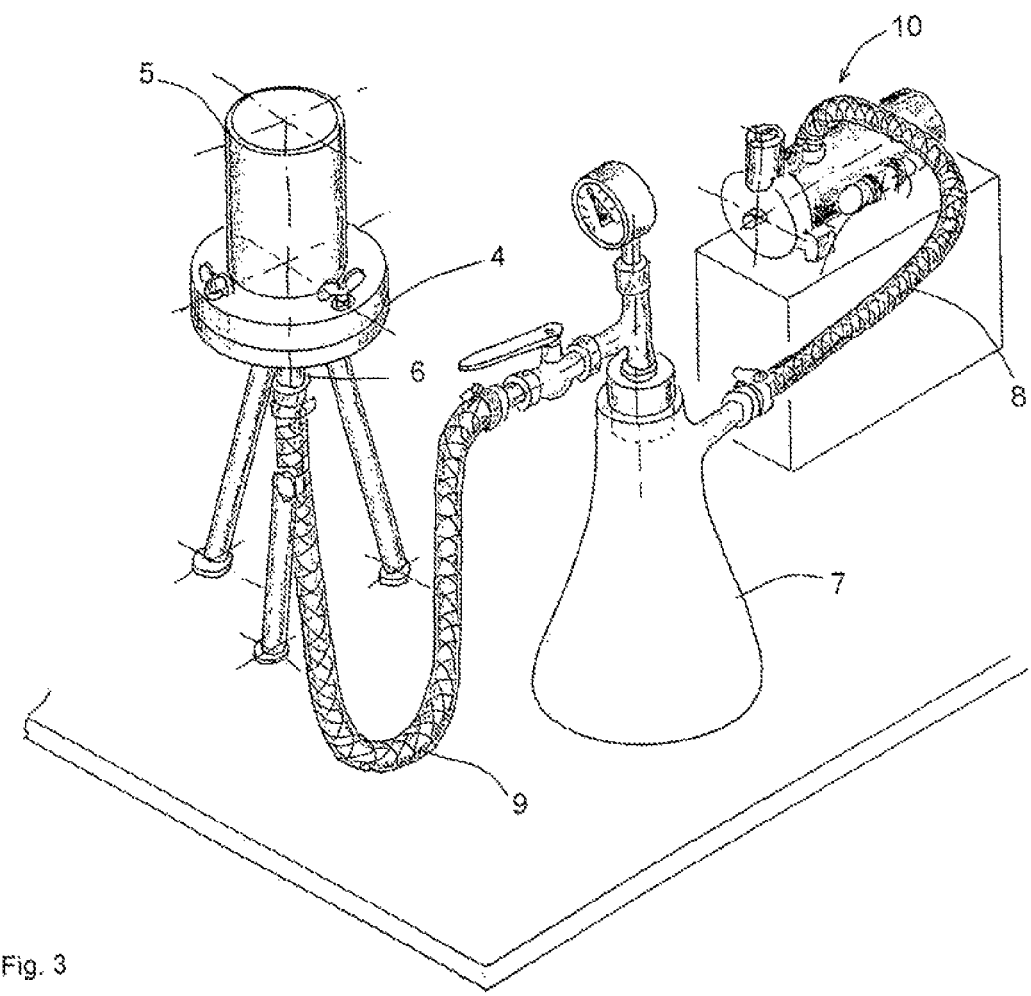
FIG. 3 is a perspective view of a laboratory apparatus for testing a filter cloth.

FIG. 3 shows the complete laboratory apparatus for testing a filter cloth. The vacuum hose 9 runs from the suction nozzle 6 of the Nutsche filter 4 to a pressure-equalizing container 7. A second vacuum hose 8 that runs directly to the vacuum pump 10 is connected to the pressure-equalizing container 7.

EXAMPLE

To be able to evaluate the effectiveness of the filter cloth 1 according to the invention, three filters with the same is structure were prepared with different materials. Beside perfluoroalkoxylalkane (PFA), polyphenylene sulfide (PPS) and polyetheretherketone (PEEK) were tested.

The properties of the three filter cloths are shown in table 1

TABLE 1

Properties of the filter cloths

| Material | Thread thickness | Weaving technique per 1 cm | Air permeability |
|---|---|---|---|
| PFA | 27 μm | 31 warp threads 20 weft threads | 350 l/(min * dm$^2$) |
| PPS | 27 μm | 31 warp threads 20 weft threads | 350 l/(min * dm$^2$) |
| PEEK | 27 μm | 31 warp threads 20 weft threads | 350 l/(min * dm$^2$) |

The filtration test was carried out as follows. 450 g FeCl$_3$ were admixed with 60 g Fe$_2$O$_3$. The solids mixture was admixed with 150 ml water. The suspension was heated in a beaker to a temperature of 170° C. while stirring continuously. This way, FeCl$_3$ went into solution and a 75% FeCl$_3$ solution was formed. The content of the beaker was poured suddenly onto the filter cloth 1. No residue remained in the beaker. The cover/beaker cap 5 was first put onto the Nutsche filter 4, and on the lower side of the filter cloth 1, a vacuum of 600 mbar was applied at the suction nozzle 6. The filter cake was formed within 10 s to 15 s. The filter cloth 1 did not show any changes. The results and the comparison between the PFA according to the invention and PPS and PEEK are shown in table 2.

TABLE 2

Comparison of the results of the filter tests

| Material | Result | Content on the filter | Time |
|---|---|---|---|
| PFA | Filter cake on filter | 58.5 g Fe$_2$O$_3$ | 15 s |
| PPS | Filter clogged | Filter residue and suspension | 8 s |
| PEEK | Filter clogged | Filter residue and suspension | 8 s |

The PVA filter material 1 according to the invention was not damaged. Even after repeating the filter test, no changes were noted in the PFA filter cloth. The comparative filters PPS and PEEK failed during filtration and showed damage.

Analysis of the filter cake of the filter 1 according to the invention has shown that the grain sizes of Fe$_2$O$_3$ were from 10 μm to 50 μm.

The tests were carried out with the PFA filter cloth 1 according to the invention with 200 l/(min*dm$^2$) and 100 l/(min*dm$^2$). The results of the tests made clear that by reducing air permeability, the retention of the finest particles increased, but no significantly longer filtration time was needed. The filter forms when the filter cake builds up and influences the degree of filtration through the particle size.

The results obtained were surprising and unexpected for those skilled in the art.

The invention claimed is:

1. A filter cloth for a belt filter, wherein
the filter cloth is made of fibers and has an air permeability of 100 l/(min*dm$^2$) to 350 l/(min*dm$^2$),
the fibers of the filter cloth have a thickness of 25 μm to 35 μm, and
the fibers of the filter cloth contain 50% by weight to 100% by weight of perfluoroalkoxylalkane (PFA).

2. The filter cloth for a belt filter according to claim 1, wherein the fibers have a fiber thickness of 28 μm to 32 μm.

3. The filter cloth for a belt filter according to claim 1, wherein the fibers of the filter cloth contain 90% by weight to 100% by weight of perfluoroalkoxylalkane (PFA).

4. The filter cloth for a belt filter according to claim 1, wherein the filter cloth has an air permeability of 100 l/(min*dm$^2$) to 200 l/(min*dm$^2$).

5. The filter cloth for a belt filter according to claim 1, wherein the filter cloth has 25 to 35 warp threads (3) and 15 to 25 weft threads (2) per 1 cm.

6. The filter cloth for a belt filter according to claim 1, wherein the filter cloth has a length from 7000 mm to 8000 mm and a width from 700 mm to 800 mm.

7. A method of making a filter cloth for a belt filter with an air permeability of 100 l/(min*dm$^2$) to 350 l/(min*dm$^2$), the method comprising the step of weaving fibers with a fiber thickness of 25 μm to 35 μm and with 50% by weight to 100% by weight of perfluoroalkoxylalkane (PFA) to form the filter cloth.

* * * * *